(12) United States Patent
Abu-Samaha (10) Patent No.: US 7,260,536 B1
(45) Date of Patent: Aug. 21, 2007

(54) DISTRIBUTED VOICE AND WIRELESS INTERFACE MODULES FOR EXPOSING MESSAGING/COLLABORATION DATA TO VOICE AND WIRELESS DEVICES

(75) Inventor: Mamoun Abu-Samaha, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 787 days.

(21) Appl. No.: 09/684,065

(22) Filed: Oct. 6, 2000

(51) Int. Cl.
*H04L 29/02* (2006.01)
*H04L 29/12* (2006.01)

(52) U.S. Cl. .............................. 704/270.1; 379/88.14; 455/414.4

(58) Field of Classification Search ................ 704/270, 704/270.1, 275; 379/88.01, 88.04, 88.13; 455/412.1, 413, 414.1, 414.4; 709/205, 206
See application file for complete search history.

(56) References Cited

U.S. PATENT DOCUMENTS

| 5,793,970 | A | * | 8/1998 | Fakes et al. ................ 709/216 |
| 5,813,008 | A | * | 9/1998 | Benson et al. ................ 707/10 |
| 5,930,471 | A | | 7/1999 | Milewski et al. |
| 5,940,598 | A | | 8/1999 | Strauss et al. |
| 5,978,566 | A | * | 11/1999 | Plank et al. ................ 709/206 |
| 5,983,190 | A | * | 11/1999 | Trower et al. .............. 704/276 |
| 6,055,236 | A | | 4/2000 | Nessett et al. |
| 6,088,696 | A | | 7/2000 | Moon et al. |
| 6,138,148 | A | | 10/2000 | Lipkin |
| 6,167,449 | A | | 12/2000 | Arnold et al. |
| 6,202,085 | B1 | * | 3/2001 | Benson et al. .............. 709/205 |
| 6,356,529 | B1 | * | 3/2002 | Zarom ........................ 370/231 |
| 6,446,076 | B1 | * | 9/2002 | Burkey et al. .............. 707/102 |
| 6,477,576 | B2 | | 11/2002 | Angwin et al. |
| 6,507,817 | B1 | * | 1/2003 | Wolfe et al. ................ 704/260 |
| 6,539,359 | B1 | * | 3/2003 | Ladd et al. .................. 704/275 |
| 6,560,633 | B1 | | 5/2003 | Roberts et al. |
| 6,578,069 | B1 | * | 6/2003 | Hopmann et al. .......... 709/203 |
| 6,590,787 | B2 | * | 7/2003 | Yasumura ................ 363/21.03 |

(Continued)

FOREIGN PATENT DOCUMENTS

WO          WO99/49388          9/1999

(Continued)

OTHER PUBLICATIONS

Seiren Solutions, "Seiren Waplook for MS Exchange," (www.seiren.net; visited Sep. 15, 2000).

(Continued)

*Primary Examiner*—Martin Lerner
(74) *Attorney, Agent, or Firm*—Richard P. Lange (57) ABSTRACT

In one aspect, a system for providing remote electronic services to a device includes an access module and a voice interface module. The access module is configured to expose messaging/collaboration data stored on a messaging/collaboration server. The voice interface module is configured to translate messaging/collaboration service requests from a voice device for presentation to the access module and to translate a requested messaging/collaboration service deliverable from the access module for presentation to the voice device. In another aspect, a wireless interface module is configured to translate messaging/collaboration service requests from a wireless device for presentation to the access module and to translate a requested messaging/collaboration service deliverable from the access module for presentation to the wireless device. The access module also integrates fax functionality with the messaging/collaboration services provided by the messaging/collaboration server.

32 Claims, 6 Drawing Sheets

U.S. PATENT DOCUMENTS

| | | | | |
|---|---|---|---|---|
| 6,594,700 | B1 | 7/2003 | Graham et al. | |
| 6,621,895 | B1 | 9/2003 | Giese | |
| 6,636,590 | B1 * | 10/2003 | Jacob et al. | 379/114.05 |
| 6,662,163 | B1 * | 12/2003 | Albayrak et al. | 704/275 |
| 6,668,043 | B2 * | 12/2003 | Hyziak et al. | 379/52 |
| 6,678,518 | B2 * | 1/2004 | Eerola | 455/422.1 |
| 6,684,087 | B1 * | 1/2004 | Yu et al. | 455/566 |
| 6,684,088 | B1 * | 1/2004 | Halahmi | 455/566 |
| 6,707,889 | B1 * | 3/2004 | Saylor et al. | 379/88.04 |
| 6,721,705 | B2 * | 4/2004 | Kurganov et al. | 704/270.1 |
| 6,757,734 | B1 * | 6/2004 | Resenius et al. | 709/230 |
| 6,775,359 | B1 * | 8/2004 | Ron et al. | 379/88.14 |
| 6,865,191 | B1 * | 3/2005 | Bengtsson et al. | 370/475 |
| 6,938,087 | B1 * | 8/2005 | Abu-Samaha | 709/227 |

FOREIGN PATENT DOCUMENTS

WO    WO00/39666    7/2000

OTHER PUBLICATIONS

Satama, "WAPLOOK Product Information," (www.waplook.com; visited Sep. 21, 2000).

Wireless Knowledge, "Workstyle Server," (www.wirelessknowledge.com; visited Sep. 24, 2000).

Wireless Knowledge, "Workstyle Server—Produce Overview White Paper," (Jul. 17, 2000).

Infowave, "Infowave Wireless Business Engine," (www.infowave.com; visited Sep. 24, 2000).

Microsoft, "Microsoft Exchange Server—Outlook Web Access Performance and Extensibility," (1999).

Zimba, "mProductivity: Introduction, Technology, Architecture," ((c) 2000; www.zimba.com, visited Sep. 9, 2000).

* cited by examiner

DISTRIBUTED VOICE AND WIRELESS INTERFACE MODULES FOR EXPOSING MESSAGING/COLLABORATION DATA TO VOICE AND WIRELESS DEVICES

CROSS-REFERENCE TO RELATED APPLICATIONS

This application is related to co-pending U.S. patent application Ser. No. 09/660,464, filed Sep. 12, 2000, by Mamoun Abu-Samaha, and entitled "Distributed Universal Communication Module For Facilitating Delivery Of Network Services To More Devices Communicating Over Multiple Transport Facilities," which is incorporated herein by reference.

TECHNICAL FIELD

This invention relates to distributed voice and wireless interface modules for exposing messaging/collaboration data to voice and wireless devices.

BACKGROUND

Various communication networks exist for enabling distributed devices to communicate and exchange information. Networks usually are classified based upon three properties: topology, protocol, and architecture. The topology of a network specifies the geometric arrangement of the network. Common topologies are a bus, ring, and star. The protocol specifies a common set of rules and signals the device on the network use to communicate. The architecture of a network refers to the network design. There are two major types of network architecture: peer-to-peer and client-server. In a peer-to-peer networking configuration, there is no central server, and devices simply connect with each other in a workgroup to share files, printers, and Internet access. In a client-server architecture, there usually is a central server, with which all of the devices register. The central server usually provides a variety of services, including centrally routed Internet access, e-mail, file sharing, and printer access, as well as ensuring security across the network. A network architecture also may be characterized as being open (i.e., the specifications are available to the public) or closed (i.e., the specifications are proprietary).

Unfortunately, different network platforms and transport facilities have developed independently of one another, each with its own idiosyncratic computing platform (hardware and software) and communications protocol. As a result, it has become increasingly difficult to implement communications programs that enable different types of devices to communicate over different networks.

Middleware products have been developed to address the need for interfaces between different computing platforms. Middleware is positioned between different components and resources of a computer network that communicate with each other. Middleware typically includes software products designed to provide various infrastructure and interfacing services between the different components and resources. Most middleware products support a tightly coupled distributed system model that requires all parts of a distributed system to be developed using a pre-defined application program interface (API). As result, any changes to any module require modifications to other modules, and changes to the API may require extensive changes to all modules. Many middleware product models have been developed (e.g., CORBA (Common Object Request Broker Architecture) from OMG, RMI (Remote Method Invocation) from Sun Microsystems, Inc., and DCOM (Distributed Component Object Model) from Microsoft Corporation). Typically, each such model is incompatible with other models, and applications developed under any such model will be unable to communicate with any application developed under a different model. Systems based upon such models typically include modules that rely upon middleware to provide a variety of services (e.g., connectivity, message routing, and data encryption). Applications developed under such a system are integrated tightly with the middleware and, therefore, are not readily integrated with the services of other systems.

SUMMARY

The invention provides a scheme by which remote users may access the full functionality of a local messaging/collaboration server (e.g., a Microsoft® Exchanger server) over wireless and voice networks.

In one aspect, the invention features a system for providing remote electronic services to a device, comprising an access module and a voice interface module. The access module is configured to expose messaging/collaboration data stored on a messaging/collaboration server. The voice interface module is configured to translate messaging/collaboration service requests from a voice device for presentation to the access module and to translate a requested messaging/collaboration service deliverable from the access module for presentation to the voice device.

In another aspect, the invention features a wireless interface module configured to translate messaging/collaboration service requests from a wireless device for presentation to the access module and to translate a requested messaging/collaboration service deliverable from the access module for presentation to the wireless device.

As used herein the term "messaging/collaboration services" refers to messaging services (e.g., e-mail, voice mail and fax services) or collaboration services (e.g., data conferencing, instant messaging and chat services), or both.

Embodiments of the invention may include one or more of the following features.

The voice interface module may generate for presentation to the voice device a request form containing a list of one or more messaging/collaboration service options. The system may include a voice interface access page configured to invoke a COM (Component Object Model) object in response to a request form completed by the voice device. The COM object preferably is configured to instantiate a server object for transmitting a request-for-service call to the access module.

A voice gateway may be provided to translate communications from the voice device from a first message format into a second message format. In one embodiment, the voice gateway is configured to translate between electronic voice signals and a voice-based markup language.

The voice interface module preferably is configured to communicate with the access module in accordance with the hypertext transfer protocol (HTTP). The voice interface module may be configured to filter a requested messaging/collaboration service deliverable for presentation to the voice device.

The wireless interface module may generate for presentation to the wireless device a request form containing a list of one or more messaging/collaboration service options. The system may include a wireless interface access page configured to invoke a COM (Component Object Model) object in response to a request form completed by the voice device. The COM object preferably is configured to instantiate a server object for transmitting a request-for-service call to the access module.

A wireless gateway may be provided to translate communications from the wireless device from a first message transfer protocol into a second message transfer protocol. The wireless gateway preferably is configured to translate between a wireless application protocol (WAP) and a hypertext transfer protocol (HTTP).

The wireless interface module preferably is configured to communicate with the access module in accordance with the hypertext transfer protocol (HTTP). The wireless interface module may be configured to filter requested messaging/collaboration service deliverable for presentation to the voice device.

The voice interface module and the wireless interface modules may reside on a different server computer than the access module. The access module may be configured to expose messaging/collaboration data stored on a Microsoft® Exchange® server computer.

Among the advantages of the invention are the following.

The invention enables remote users equipped with voice or wireless devices to access business critical information in real-time using a familiar user interface. The invention leverages existing messaging/collaboration services available from a local messaging/collaboration server, as well as current investments in training and support to provide simple, flexible and fast access to personal and team information in a manner requiring minimal training and support. In addition to providing access to such information as contacts, calendar, e-mail and tasks, the invention enables remote users to exchange contact, scheduling and other data with other users in real-time.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments or relative dimensions of the depicted elements, and are not drawn to scale.

Figure 1:
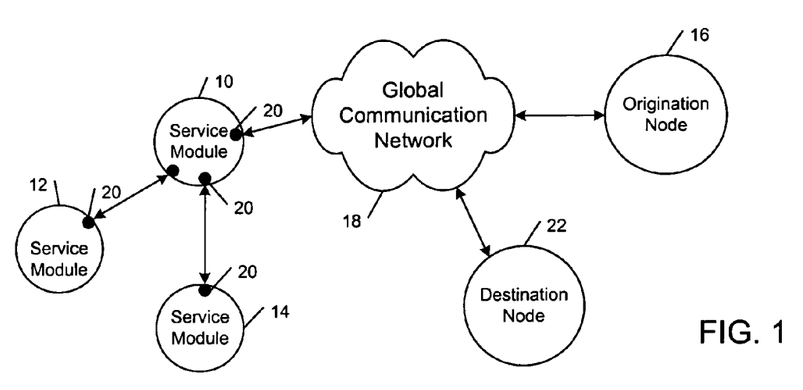
FIG. 1 is a diagrammatic view of a plurality of service modules performing respective functions cooperatively to provide one or more messaging/collaboration services to an origination network node connected to a global communication network.

Referring to FIG. 1, in one embodiment, one or more remote service modules 10, 12, 14 may perform respective functions cooperatively to provide one or more remote messaging/collaboration services to an origination network node 16 that is connected to service modules 10-14 by a global communication network 18. Each service module 10-14 accesses a respective instance of a universal or generic communication module 20, which encapsulates one or more processes for communicating with a variety of different devices over multiple transport facilities. Universal communication module 20 is accessible simultaneously at multiple nodes of a distributed computing environment to manage the communication requirements of each service module 10-14. In particular, universal communication module 20 manages service communication in a way that shields service module developers from the idiosyncrasies of different networks, protocols, devices, standards, routing, recovery and other transport difficulties or differences. As a result, a device operating at origination network node 16 may request a remote messaging/collaboration service, and service components 10-14 may cooperate to produce a service deliverable that may be transmitted back to the origination node 16 or transmitted to another destination node 22 in an appropriate format.

Figure 2:
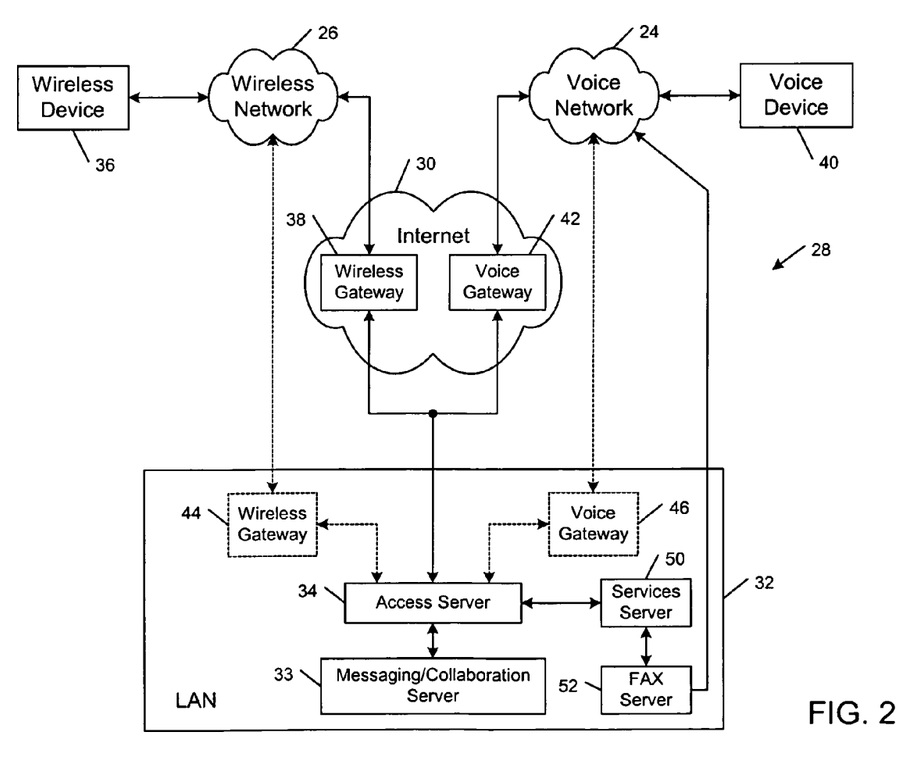
FIG. 2 is a diagrammatic view of a global communication network including a voice network, a wireless network, and a computer network that includes the Internet and a local area network with a messaging/collaboration server.

As shown in FIG. 2, global communication network 18 may include a number of different computing platforms and transport facilities, including a voice network 24, a wireless network 26 and a computer network 28, which includes the Internet 30 and a local area network (LAN) 32. The remote messaging/collaboration services provided by a messaging/collaboration server 33 (e.g., a Microsoft® Exchange server) may be accessed through an access server computer 34 of LAN 32. Request-for-service calls may be made and requested service deliverables (electronic contents) may be presented in a number of different media formats, including a generic format (e.g., text) or a specific format, such as voice, Internet, e-mail and wireless formats. For example, voice contents may be presented as Voice extensible Markup Language (VoxML) documents; Internet contents may be presented as Hypertext Markup Language (HTML) documents; e-mail contents may be presented as Microsoft Exchange or open-mail documents; and wireless contents may be presented as Wireless Markup Language (WML) documents. As explained in detail below, the universal communication module 20 enables messages and service deliverables to be transmitted between service components and other network nodes in accordance with a generic communications protocol (e.g., the Hypertext Transfer Protocol (HTTP)).

Devices connected to global communication network 18 may access a wide variety of messaging/collaboration services provided by messaging/collaboration server 33 through access server computer 34. For example, in one illustrative implementation, a wireless device 36 (e.g., a wireless personal digital assistant (PDA) or a WAP-enabled cellular telephone) may connect to access server computer 34 over wireless network 26. Communications from wireless device 36 are in accordance with the Wireless Application Protocol (WAP). An Internet wireless gateway 38 converts the WAP communications into HTTP messages that may be processed by access server computer 34. In another illustrative implementation, a voice device 40 may connect to server computer 34 over voice network 24. Voice device 40 may be a legacy voice device (e.g., a conventional analog or digital telephone) or an advanced voice device (e.g., a VoxML-enabled telephone with text-to-speech and speech-to-text functionality). Accordingly, communications from voice device 40 may be in the form of conventional analog or digital voice signals, or they may be formatted as VoxML messages. An Internet voice gateway 42 may use speech-to-text technology to convert the voice signals into HTTP messages, and VoxML messages may be converted to HTTP messages based upon an extensible style language (XSL) style specification. Voice gateway 42 also is configured to receive from access server computer 34 real-time voice messages that may be passed directly to voice device 40, as well as formatted messages (e.g., VoxML, XML, WML, e-mail) that must be converted to a real-time voice format (e.g., using text-to-speech technology) before the messages may be passed to voice device 40.

In other embodiments, wireless device 36 and voice device 40 may communicate with access server 34 through a wireless gateway 44 and a voice gateway 46 residing on LAN 32 rather than through Internet wireless gateway 38 and Internet voice gateway 42.

As explained in detail below, when a device initially contacts access server computer 34, access server computer 34 may present to the device an appropriately formatted message containing a list of available messaging/collaboration services, such as real-time access to e-mail, calendar, contacts and tasks data stored on a messaging/collaboration server 33. The device may transmit a request-for-service call and access server computer 34 may process the call to identify the requested service and the network address where the resulting service deliverable should be transmitted. If additional information is needed to deliver the service, access server computer 34 may transmit a message prompting the user of the device to provide the needed information. In response to the request-for-service call, server computer 34 initiates one or more service modules 10-14, which may reside on access server 34 or on a separate services server 50, or both, to produce the requested service deliverable. Through respective instances of universal communication module 20, one or more service modules 10-14 cooperatively perform respective tasks to produce the requested service deliverable. Universal communication module 20 also enables service modules 10-14 to access legacy applications and databases, as well as control hardware devices (e.g., a fax server 52 for faxing documents, or a telephone switch for call redirection) that are connected to global network 18. A source service module passes the service deliverable and one or more control parameters obtained from the request-for-service call to an instance of universal communication module 20. Based upon the control parameters, universal communication module 20 communicates with the device operating at destination network node 22 to determine its type classification. Universal communication module 20 formats the service deliverable in accordance with the type classification of the destination device, and transmits the formatted service deliverable to the destination device. After delivery of the service deliverable, universal communication module 20 may call back to the source service, establish a link with another service or end processing.

Figure 3:
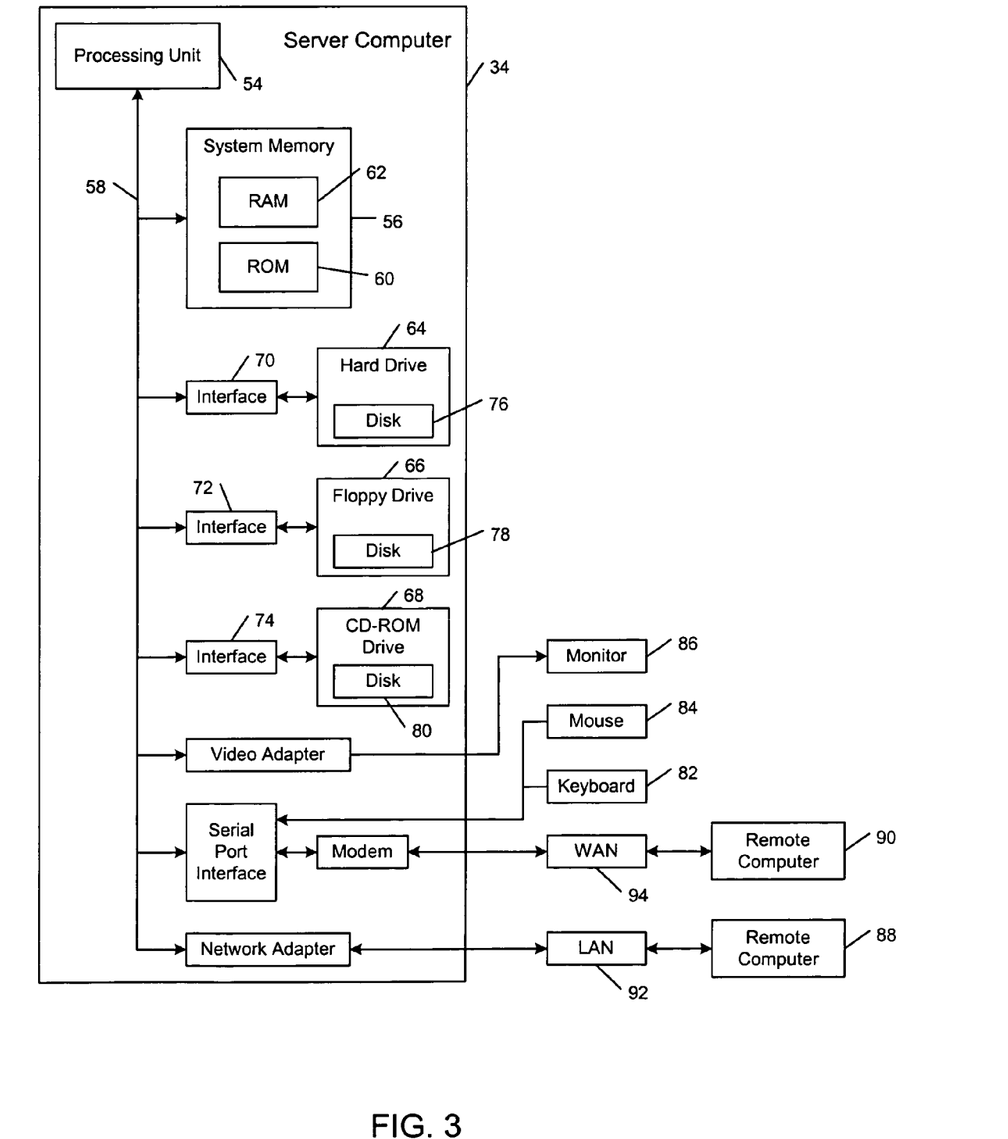
FIG. 3 is a block diagram of a computer network that includes a server computer and two remote computers.

Referring to FIG. 3, in one embodiment, an access server computer 34 includes a processing unit 54, a system memory 56, and a system bus 58 that couples processing unit 54 to the various components of server computer 34. Processing unit 54 may include one or more processors, each of which may be in the form of any one of various commercially available processors. System memory 56 includes a read only memory (ROM) 60 that stores a basic input/output system (BIOS) containing start-up routines for server computer 34, and a random access memory (RAM) 62. System bus 58 may be a memory bus, a peripheral bus or a local bus, and may be compatible with any of a variety of bus protocols, including PCI, VESA, Microchannel, ISA, and EISA. Server computer 34 also includes a hard drive 64, a floppy drive 66, and CD ROM drive 68 that are connected to system bus 58 by respective interfaces 70, 72, 74. Hard drive 64, floppy drive 66, and CD ROM drive 68 contain respective computer-readable media disks 76, 78, 80 that provide non-volatile or persistent storage for data, data structures and computer-executable instructions. Other computer-readable storage devices (e.g., magnetic tape drives, flash memory devices, and digital video disks) also may be used with server computer 34. A user may interact (e.g., enter commands or data) with server computer 34 using a keyboard 82 and a mouse 84. Other input devices (e.g., a microphone, joystick, or touch pad) also may be provided. Information may be displayed to the user on a monitor 86. Server computer 34 also may include peripheral output devices, such as speakers and a printer. Server computer 34 may be connected to remote computers 88, 90, which may be workstations, server computers, routers, peer devices or other common network nodes. Remote computer 88 may be connected to server computer 34 over a local area network (LAN) 92, and remote computer 90 may be networked over a wide area network (WAN) 94 (e.g., the Internet 30).

Figure 4:
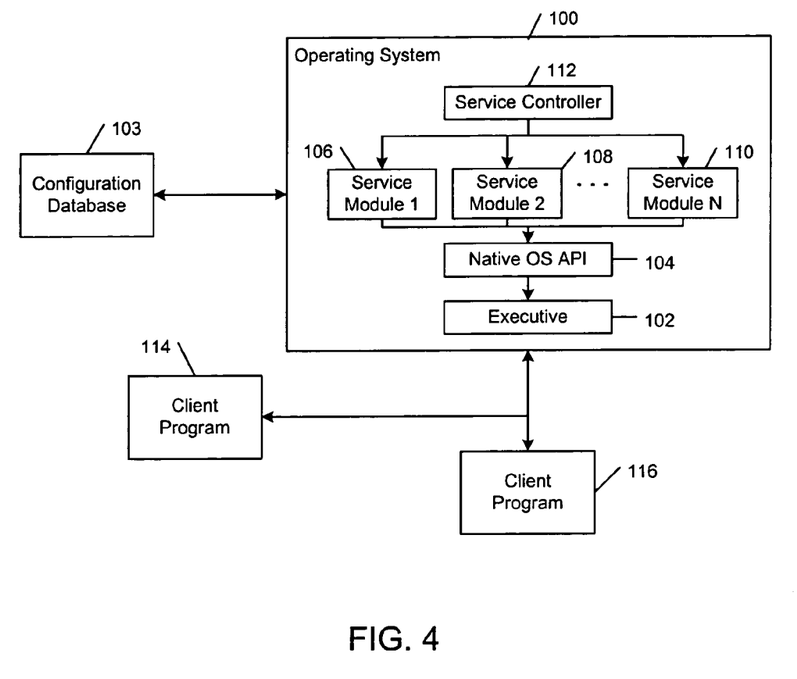
FIG. 4 is a block diagram of a service module execution environment provided by the server computer of FIG. 3.

Referring to FIG. 4, a number of program modules may be stored on storage drives 64-68 and in RAM 60, including an operating system 100 (e.g., the Windows NT Server operating system available from Microsoft Corporation of Redmond, Wash. U.S.A.), one or more application programs, and program data. Operating system 100 includes an executive 102 that provides the base operating system services (e.g., memory management, process and thread management, security, input/output, and inter-process communication) for creating a run-time execution environment on access server computer 34. A configuration database (or registry) 103 contains the following information: parameters needed to boot and configure the system; system-wide software settings that control the operation of operating system 100; a security database; and per-user profile settings. A native operating system (OS) application programming interface (API) 104 exposes the base operating system services of executive 102 to user applications and to one or more service modules (or simply "services") 106, 108, 110. As used herein, the term "service" (or "service module") refers to a component of an operating system that provides a set of one or more functions. Service modules 106-110 are user-mode processes that may be configured to start automatically at system boot time without requiring an interactive logon; they also may be controlled dynamically during run-time. Service modules 106-110 call certain base operating system services (or functions) to interact with a service controller 112; such functions may include registering a successful startup, responding to status requests, and pausing or shutting down the service. Service controller 112 starts, manages and directs operations within service modules 106-110. Service modules 106-110, on the other hand, create the environment in which one or more processes may operate and control the start-up, maintenance and termination of such processes. Typically, the run-time execution environment is installed on server computer 34, and one or more client application programs 114, 116 operating on remote computers 88, 90 may access the functionality provided by service modules 106-110 over their respective network connections. In an alternative embodiment, the run-time execution environment may be installed on a single computer that hosts both service modules 106-110 and client programs 114, 116.

Before a service module 106-110 may operate in the run-time execution environment, it must be installed on server computer 34. A service module typically is installed by storing the service module in a data storage area that is accessible by server computer 34 (e.g., on disk 76 of in hard drive 64), and registering the attributes of the service module in configuration database 103. The universal communication module 20 also is registered in configuration database 103. The remote service modules may be configured as a dynamic link library (DLL). A DLL is a computer code module that contains functions that may be linked with application code. A DLL may be loaded and linked to an application at run time, and may be unloaded when its functionality is no longer needed.

As mentioned above, access server 34 provides secure access to business critical messaging/collaboration information residing on messaging/collaboration server 33. Access server 34 enables businesses to extend the functionality of the local messaging/collaboration server 33 to remote users equipped with voice devices (e.g., a legacy telephone or an advanced telephone) or wireless devices (e.g., wireless phones, laptops, and other wireless Internet devices). In particular, access server 34 enables remote users to access their e-mail, contacts, calendar, and tasks data. In addition, access server 34 extends the collaboration features of the local messaging/collaboration server 33 to remote users. The architecture of access server 34 optimizes secure transmission and presentation of information over global communication network 18, and is accessible by a wide variety of devices over networks supporting standard network and security protocols (e.g., Windows® NT domain authentication) and firewalls.

Figure 5A:
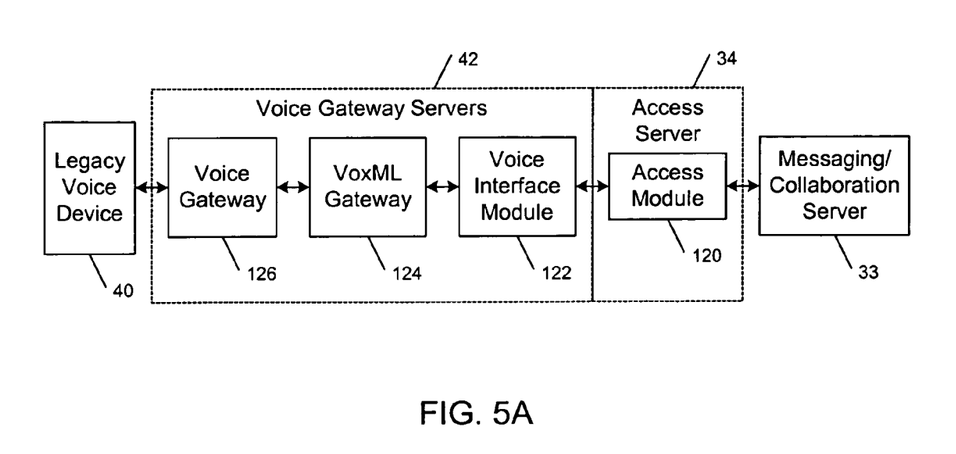
FIG. 5A is a block diagram of a voice device communicating with the messaging/collaboration server of FIG. 2.

Referring to FIG. 5A, in one embodiment, an access module 120 is configured to expose messaging/collaboration data stored on messaging/collaboration server 33 in accordance with an open message transfer protocol. A voice interface module 122 is configured to translate messaging/ collaboration service requests from voice device 40 for presentation to access module 120 and to translate requested messaging collaboration data from access module 120 for presentation to voice device 40. For example, a legacy voice device may access the services of messaging/collaboration server 33 as follows. After connection of a legacy voice device, a VoxML gateway 124 transmits a VoxML request form to a voice gateway 126. The VoxML request form may present one or more service options for selection by the legacy voice device. The VoxML request form is sent to voice gateway 126 using the HTTP transfer protocol. Voice gateway 126 translates the VoxML request form into analog or digital voice signals using text-to-speech technology. The translated VoxML request form may be presented to the legacy voice device as a voice-based option tree. The legacy voice device may respond to the translated VoxML request form with voice signals or keystroke signals, or both. Voice gateway 126 translates the signals received from the legacy voice device into a VoxML message using speech-to-text technology and an XSL style specification. The VoxML message is sent to VoxML gateway 124 using the HTTP transfer protocol. The receipt of the HTTP message triggers an access file (e.g., an active server page) on VoxML gateway 124. The access file executes a script (e.g., a JAVA script or a Visual Basic® script) that handles the completed VoxML request form and creates voice interface access module 122, which transmits an HTTP request-for-service call to access module 120. Access module 120 transmits a request-for-service function call to a COM (Component Object Model) interface of messaging/collaboration server 33. An advanced voice device may access the services of messaging/collaboration server 33 in a similar way, except the advanced voice device may bypass voice gateway 126 and communicate directly with VoxML gateway 124 because the functionality provided by voice gateway 126 is incorporated into the advanced voice device.

In another embodiment, the functionality of voice gateway 126 and VoxML gateway 124 may be incorporated into a single voice gateway server computer 42.

Figure 5B:
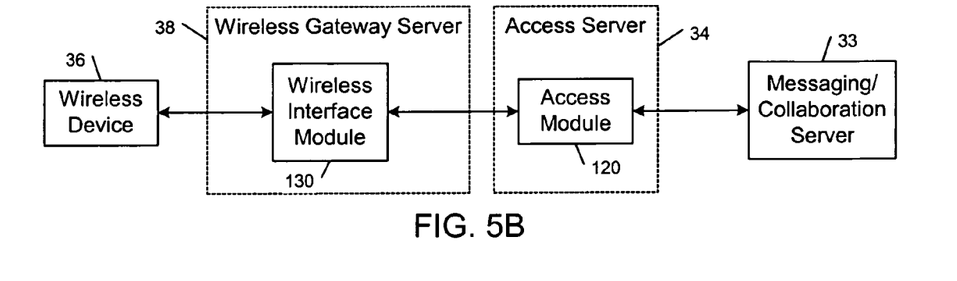
FIG. 5B is a block diagram of a wireless device communicating with the messaging/collaboration server of FIG. 2.

As shown in FIG. 5B, in another embodiment, a wireless interface module 130 is configured to translate messaging/ collaboration data requests from wireless device 36 for presentation to access module 120 and to translate requested messaging/collaboration data from access module 120 for presentation to wireless device 36. Wireless device 36 may connect to access server 34 through wireless gateway 38, which communicates with access server 34 using a standard communication protocol (e.g., HTTP). Wireless gateway 38 may present a WML request form containing one or more messaging/collaboration service options to wireless device 36. Wireless module 130 translates the response signals received from wireless device 36 into an HTTP message, and transmits the HTTP message to access server 34. The receipt of the HTTP message at access server 34 triggers an access file that creates access module 120, which transmits a request-for-service function call to a COM interface of messaging/collaboration server 33.

Figure 6A:
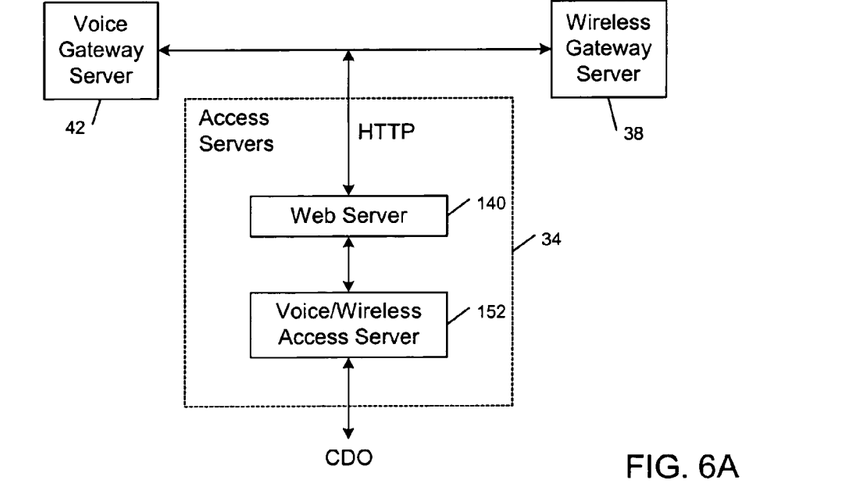
FIG. 6A is a block diagram of a web server and a voice/wireless access server that is configured to expose messaging/collaboration data stored on the messaging/collaboration server of FIG. 2.

Referring to FIG. 6A, in one embodiment, voice interface module 122 may reside on voice gateway server 42 and wireless interface module 130 may reside on wireless gateway server 38. In operation, voice gateway server 42 and wireless gateway server 38 are configured to translate messaging/collaboration service requests received from voice device 40 and wireless device 36, respectively, into request-for-service calls that includes a URI (uniform resource identifier) or a URL (uniform resource locator) with the IP address for an access file corresponding to the requested service. A request-for-service call is presented originally in HTTP format or it is converted to HTTP format. A HTTP request-for-service call has the following format: an initial line, zero or more header lines, a blank line, and an optional message body. The initial line may specify a request or a response. A request line has three parts, separated by spaces: a method name, the local path of the requested resource, and the version of HTTP being used. The initial response line (i.e., the status line) also has three parts separated by spaces: the HTTP version, a response status code that specifies the result of the request, and a description of the status code. Header lines provide information about the request or response, or about the object sent in the message body. The message body may contain binary data, file contents and query data (collectively referred to herein as "data").

In one embodiment, a HTTP request-for-service call may contain one or more of the following control parameters: an origination address, a security profile identifier, a service identifier, an output_type identifier, a destination address, and data. In this embodiment, a typical HTTP request-for-service would have the following format:

<initial line>
origination_address: value 1
security_profile: value 2
service: value 3
output_type: value 4
destination_address: value 5
<message body: data>

The origination address and the destination address correspond to the specific network addresses (e.g., telephone number, radio modem ID, IP address, or x.25 address) by which an incoming message was received and by which an outgoing message is to be delivered, respectively.

Figure 6B:
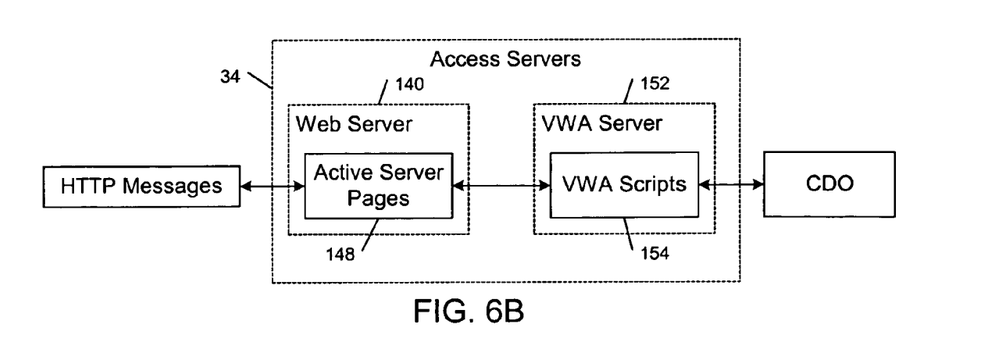
FIG. 6B is a flow diagram of the information passed between components of the communication system of FIG. 6A.
Figure 6C:
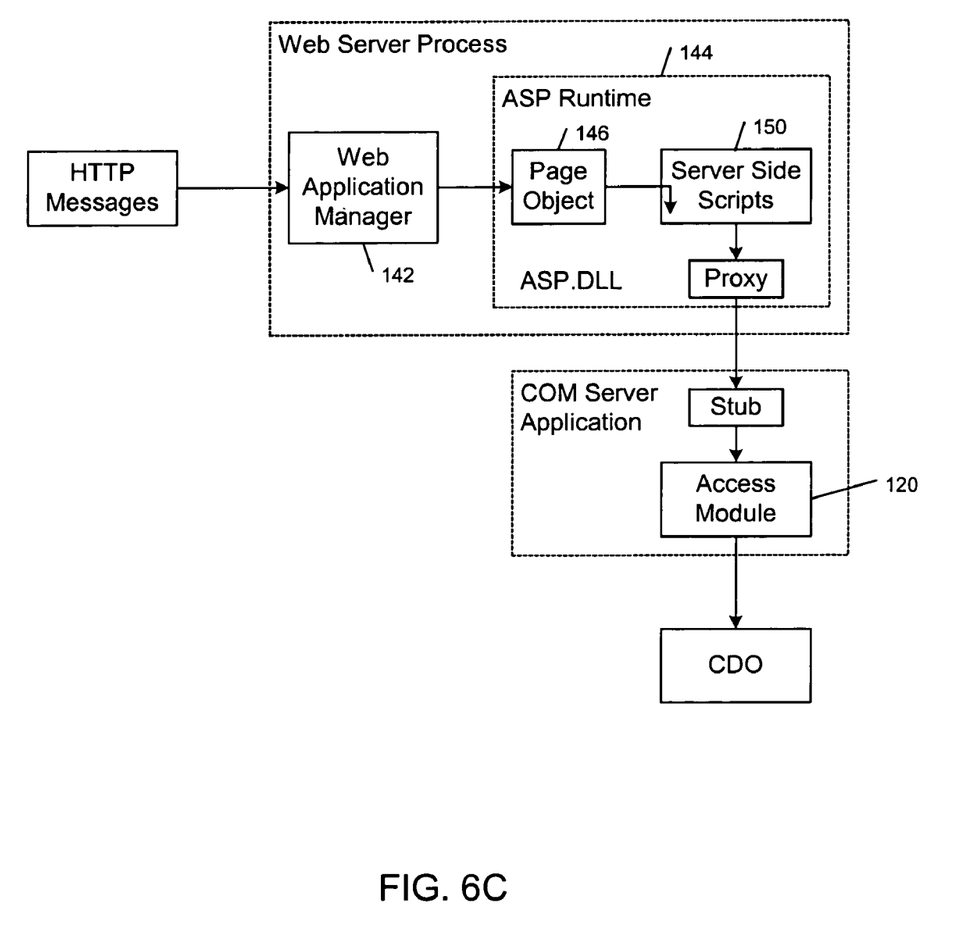
FIG. 6C is a diagrammatic view of server components generated in the communication system of FIG. 6A.

Referring back to FIG. 6A and to FIGS. 6B and 6C, request-for-service calls (or messages) are received by a web server 140, which may be a Microsoft® Internet Information Server (IIS). Upon receipt of a request-for-service call, a web application manager 142, which monitors incoming service requests, routes the request-for service call to an access file runtime 144 (e.g., an ASP runtime). Access file runtime 144 creates a web server component 146 (or an internal page object) that runs a filter on the access file 148, which corresponds to the requested resource identified by a URI in the initial line of the request-for-service call, to parse out any server-side processing instructions 150. Access file runtime 144 causes server computer 34 to execute a script contained within the access file 148. Execution of the script extracts the control parameters from the request-for-service call and initiates access module 120. In one embodiment, access module 120 is implemented as a COM object and resides on a separate voice/wireless access (VWA) server 152. The control parameters may be passed to access module 120 in a text format. Each call from access file 148 to access module 120 is executed across process boundaries with the help of a proxy/stub pair. Access module 120 executes VWA scripts 154 to produce a service deliverable exposing the messaging/collaboration data stored on messaging/collaboration server 33. Collaboration Data Object (CDO) provides an object library that allows VWA server 152 to communicate with messaging/collaboration server 33 and take advantage of its collaboration capabilities.

Figure 7:
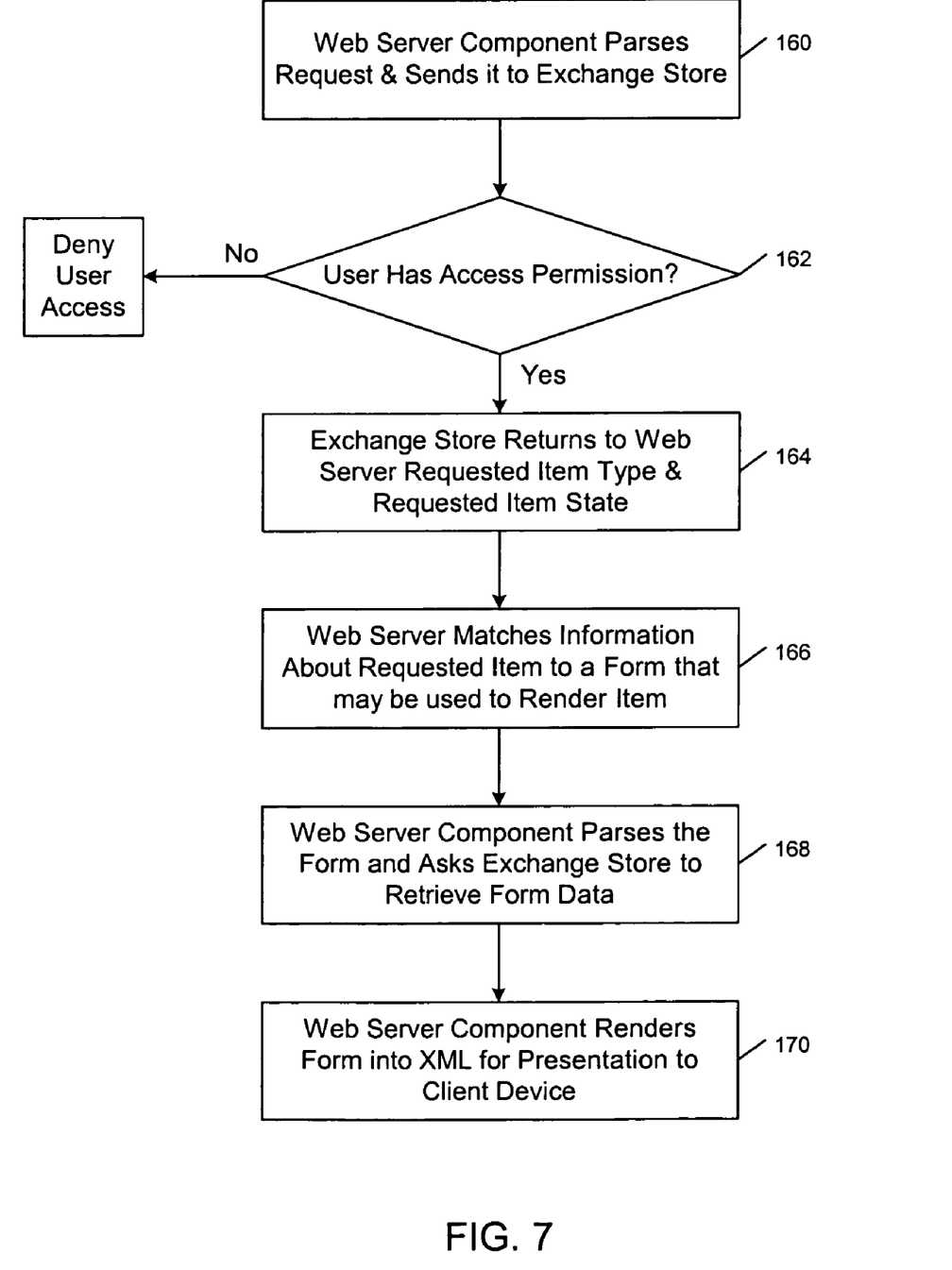
FIG. 7 is a flow diagram of a method of processing a request for a messaging/collaboration service.

Referring to FIG. 7, in one embodiment, access module 120 communicates with messaging/collaboration server 33 as follows. The web server component 146 parses the request-for-service call and sends it to the messaging/collaboration server 33 (step 160). Messaging/collaboration server 33 verifies that the user has permission to access the requested item (step 162). Assuming there is no problem with access, messaging/collaboration server 33 returns the type and state (e.g., read or unread) of the requested item (step 164). The web server component 146 matches the information about the requested item to a form that may be used to render the item (step 166). The web server component 146 parses the form and asks messaging/collaboration server 33 to retrieve the form data (step 168). After messaging/collaboration server 33 returns the requested data, the web server component 146 renders the form into an appropriate extensible markup language (XML) for presentation to the client device (step 170).

Messaging/Collaboration Services

Access module 120 extends the existing functionality of messaging/collaboration server 33 to remote users equipped with any networked device. In one embodiment, access server 34 leverages the functionality of a Microsoft® Exchange server to present complete Microsoft® Outlook® messaging and collaboration functionality on any networked device, including voice and wireless devices. In particular, access module 120 is fully Exchange compliant, including the ability to retain collaboration features for each messaging/collaboration item from any device to any device based upon the class of the item. Among the key features extended to remote users by access module 120 are the following:

Receive notifications, including e-mail and calendar notifications based upon user-defined rules Access complete e-mail functionality, including reading (with or without attachments), replying, sorting, filtering and forwarding (with or without attachments) e-mails Access complete contacts functionality, including creating, viewing and editing contacts, accessing and searching personal contacts and global address lists Access complete calendar functionality, including accepting and declining meeting invitations; creating, viewing and editing appointments and meetings; canceling meetings and sending notification messages to attendees; e-mail meeting attendees; compose meeting notes; set custom notification rules for meeting requests and cancellations Access team calendars, team mailboxes and team contacts In addition, access module 120 provides faxing functionality on two levels. In particular, access module 120 allows remote users to send faxes directly through fax server 50 (e.g., based upon a selected contact item). Access module 120 also allows remote users to append fax functionality to any Exchange feature. For example, a remote user may read an e-mail message and then fax the e-mail to a desired destination. When the fax functionality is selected at the item level, access module 120 expands any message attachments for fax transmission. Thus, a user may compose a fax message with a document of any type (e.g., .pdf, .doc, .xls, .htm, .html, .txt, .ppt, as well as image document formats, including .jpg) appended as an attachment, and fax the message and attachment to any fax device.

Access module 120 includes embedded Windows® NT security features (e.g., Windows® NT domain authentication). In addition, access module 120 manages sessions by creating XML structures for holding long variable names and references, and by passing only simple references (e.g., an HTTP cookie) to the destination device. When the destination device needs particular data, the simple reference may be replaced on the server with the actual referenced data, which may be passed to the messaging/collaboration server. In some embodiments, access module 120 is optimized for delivery to small-capacity devices by minimizing the header and gateway data transmitted to the destination device and filtering out characters that are incompatible with the destination device. For example, in a session with a small-capacity destination device, such as a WAP-enabled mobile phone, access module 120 may divide a large message into a plurality of smaller sub-messages, and transmit to the destination device the following sessionID-_Inbox.wml file, which contains a list of the sub-messages that may be accessed by the device.

(sessionID_Inbox.wml)

<?xml version=1.0"?>

<! DOCTYPE wml PUBLIC "-//WAPFORUM//DTD WML 1.1//EN"

"http://www.wapforum.org/DTD/wml_1.1.xml">

<!—WML Code Generated dynamicly by: Mamoun_Abu-Samaha@hp.com+1(925)228 3936 Telnet: 547 7056—>

<wml>
  <template>
  <do type="prev">
    <prev/>
  </do>
  </template>

<card id="VIEW" title="Inbox">

<p>

<a href="CDOList.asp?SID=454644327&#38; Folder=Inbox&#38;Start=1&#38;Size=5" title="Prev">Prev 1-5</a>

</p>

<p>

<a href="CDOGetItemDetails.asp?SID=454644327&#38; Folder=Inbox&#38;Start=1 &#3 8;ID=6&#38;Size=400" title "6">RE: first a ABU-SAM</a>

<p>

<a href="CDOGetItemDetails.asp?SID=454644327&#38; Folder=Inbox&#38;Start=1 &#3 8;ID=7&#38;Size=400" title="7">FW: this is ABU-SAM</a>

<p>

<a href="CDOGetItemDetails.asp?SID=454644327&#38; Folder=Inbox&#38;Start=1&#3 8;ID=8&#38;Size=400" title="8">Re:FW: this VIEW,WP</a>

</p>

<p>

<a href="CDOGetItemDetails.asp?SID=454644327&#38; Folder=Inbox&#38;Start=1&#3 8;ID=9&#38;Size=400" title="9">ATT TEST ROBINSO</a>

</p>

<p>

<a href="CDOGetItemDetails.asp?SID=454644327&#38; Folder=Inbox&#38;Start=1&#3 8;ID=10&#38;Size=400" title="10">today's pre ABU-SAM</a>

</p>

<p>

<a href="CDOList.asp?SID=454644327&#38; Folder=Inbox&#38;Start=11&#38;Size=5 title="Next">Next 11-13</a>

</p>

</card>

</wml>

At the same time, access module 120 stores on the server the following sessionID_Inbox.xml file, which contains references to the actual content of each of the corresponding sub-messages.

(sessionID_Inbox.xml)

Inbox"0000000038A1BB1005ES101AA1BB08002B2A5 6C20000454D534D44422E444C4 C0000000000000001BS5FA20AA6611CD9BC800AA00 2FC45A0C00000058435550303 2002F6F3D68702F6F753D616D6572696361732F636E3 D526563697069656E74732F636E3D616D2D363237353 900"

ID="1">000000005BEB8C6319E4D311AB5700902740 B9F207004341 EF5F8B4AD311AB4B00902740B9F200000192D004000 04341 EF5F8B4AD311AB4B00902740B9F200000 192D0510000</Item>

<Item ID="2">000000005BEB8C6319E4D311AB5700902740B 9F207004341EF5F8B4AD311AB4B00902740B9F20000 0192D00400004341EF5F8B4AD311AB4B00902740B9F 200000 192D0560000</Item>

<Item ID="3">000000005BEB8C6319E4D311AB5700902740B 9F207004341EF5F8B4AD311AB4B00902740B9F200000 192D00400004341EF5F8B4AD311AB4B00902740B9F2 00000 192D05D0000</Item>

<Item ID="4">000000005BEB8C6319E4D311AB5700902740B 9F207004341EF5F8B4AD311AB4B00902740B9F20000 0192D00400004341 EF5F8B4AD311 AB4B00902740B9F200000 192D0610000</Item>

<Item ID="5">000000005BEB8C6319E4D311AB57009027 40B9F207004341EF5F8B4AD311AB4B00902740B9F20 0000192D00400004341EF5F8B4AD311AB4B00902740 B9F200000 192D0630000</Item>

The following filter file stores the parameters needed to strip and replace unnecessary characters from the messages transmitted to the destination device.

'For Text fields a filtering is needed to be
'compatiable with WAP 1.0 character set
'This schema will be read by the object and
'Eliminate the problems from the WAP device
'or any other VIEW Device
'Developer:Mamoun Abu-Samaha +1 925 228 3936
'Use the following syntax:
'[REMOVE]text to be removed
'[replace]this text[with]Another text
'[REMOVE FROM]start of text[TO]End of text to be removed
'This will help display clean and optimized characters
'[REMOVE FROM] Message-Id: [TO] Encoding:

[replace]<[with]<
[replace]>[with]>
[replace]&[with]&
[replace]" [with]"
[replace]' [with]'
[remove]•

Other Services

The messaging/collaboration services made available to remote users by access server 34 may be combined with one or more other services to provide a service deliverable that may be transmitted to origination network node 16 or to destination network node 22, or both. As used herein, the term "service deliverable" refers broadly to the results of push services processing, pull services processing, or transaction services processing. Push services send service deliverables to a destination node without receiving a request from the destination node. Pull services send service deliverables to the origination node upon request. Transaction services enable the origination node to control one or more computer processes or applications (e.g., enable an origination device to write data to a database).

Service modules may function alone or in combination in accordance with a number of different services models to provide a wide range of electronic services over multiple transport facilities. In a master-slave services model, a master service may access an instance of universal communication module 20 to launch one or more slave services and send each slave a task to accomplish. The master service may wait until the slave services complete their processing tasks. In a fault tolerant services model, an original service may replicate its tasks to other services through universal communication module 20 to maintain one or more redundant services that synchronize with the original service until the original service fails. In a load balancing services model, an original service may distribute its tasks through universal communication module 20 throughout the network. The original service may monitor and process the results produced by the other services. In a cooperative processing model, one or more services may communicate through respective instances of universal communication module 20 and collaborate to produce a particular service deliverable.

A service module may be written in any programming language and may be configured to provide any service so long as it communicates with universal communication object 20 in accordance with a prescribed application program interface (API). In particular, each service module must pass certain parameters obtained from the request-for-service call and the service deliverable in an HTML format or a text format. In addition, a service module should filter or otherwise modify the content of the resulting service deliverable to support delivery to the specified destination device. For example, if the destination device is a wireless device, such as a WAP-enabled cellular telephone or a PDA that has limited viewing resources or limited bandwidth, or both, the service deliverable should be filtered to reduce the amount of information transmitted to the destination device. For example, images or other contents that cannot be adequately viewed or received by the destination device might be removed before the service deliverable is transmitted to the destination device.

In operation, a service module passes the service deliverable and the control parameters obtained from the request-for-service call to an instance of universal communication module 20 as a functional call to a COM (Component Object Model) interface. Based upon the control parameters, universal communication module 20 may communicate with an agent operating within the destination device to determine the type classification of the destination device. Alternatively, the origination device may specify the destination device format in the request-for-service call. Universal communication module 20 formats the service deliverable in accordance with the type classification of the destination device, and transmits the formatted service deliverable to the destination device. Universal communication module 20 may format the service deliverable into a generic format (e.g., text) or a particular (e.g., style sheet or template) document format. Universal communication module 20 may format the service deliverable into an appropriate media format based upon an extensible style language (XSL) style specification, which specifies a way in which style may be separated from content in extensible markup language (XML) documents. For example, universal communication module 20 may pass the service deliverable received from service module 10 to the destination device in any of the following markup language formats: VoxML for voice-based destination devices; HTML for Internet-based destination devices; and WML for wireless-based destination devices. Universal communication module also is configured to convert the service deliverable into any of the following additional formats: a voice-mail file or phone tree signals activating a text-to-voice or a voice-to-text service for voice-based destination devices; and e-mail, open-mail, SMS (systems management server), SMTP (simple mail transfer protocol) or Microsoft Exchange for e-mail-based destination devices.

After delivery of the service deliverable, universal communication module 20 may call back to the source service module, establish a link with another server object, or end processing.

The systems and methods described herein are not limited to any particular hardware or software configuration, but rather they may be implemented in any computing or processing environment. Access module 120 and universal communication module preferably are implemented in a high level procedural or object oriented programming language; however, the programs may be implemented in assembly or machine language, if desired. In any case, the programming language may be a compiled or interpreted language. In one embodiment, access module 120 and universal communication module 20 are implemented as a library of COM (Component Object Model) objects that may access one or more CDOs (Collaboration Data Objects). The CDOs are provided by the standard COM library, which is part of the operating system for Win32 platforms and is available as a separate package for other operating systems. The attached Appendix contains code listings for components of access server 34 exposing some of the data and functionality of a Microsoft® Exchange server.

Access module 120 and universal communication module 20 may be implemented in other programming paradigms, if desired. For example, although the above embodiments have been described in connection with the Microsoft NT server operating system, the embodiments easily may be programmed to operate in another computing environment, such as a Unix-based (e.g., Linux) computing environment utilizing JavaServer Page access file technology.

Other embodiments are within the scope of the claims.

What is claimed is:

1. A system for providing remote electronic services to a voice device, comprising:

an access module configured to expose messaging/collaboration data, including at least one of electronic mail data, calendar data, contacts data, and tasks data, that are stored on a messaging/collaboration server, wherein the access module is configured to manage amount of data transmitted to the voice device to accommodate capacity constraints of the voice device, wherein the access module additionally is configured to create a replacement reference identifying a data item identified by a messaging/collaboration server reference into the messaging/collaboration data, pass the replacement reference to the voice device without passing the data item, and store an association between the replacement reference and the messaging/collaboration server reference, wherein the access module is configured to transmit the referenced data item to the voice device in response to receipt of the replacement reference from the voice device;

a voice interface module configured to translate messaging/collaboration service requests from the voice device for presentation to the access module and to translate a requested messaging/collaboration service deliverable from the access module for presentation to the voice device, wherein the voice interface module generates for presentation to the voice device a request form containing a list of one or more messaging/collaboration service options; and a voice interface access page configured to invoke a COM (Component Object Model) object in response to a request form completed by the voice device.

2. The system of claim 1, wherein the COM object is configured to instantiate a server object for transmitting a request-for-service call to the access module.

3. The system of claim 1, further comprising a voice gateway for translating communications from the voice device from a first message format into a second message format.

4. The system of claim 3, wherein the voice gateway is configured to translate between electronic voice signals and a voice-based markup language.

5. The system of claim 1, wherein the voice interface module is configured to communicate with the access module in accordance with the hypertext transfer protocol (HTTP).

6. The system of claim 1, wherein the voice interface module is configured to filter a requested messaging/collaboration service deliverable for presentation to the voice device.

7. The system of claim 1, wherein the access module and the voice interface module reside on different server computers.

8. The system of claim 1, wherein the access module is configured to expose messaging/collaboration data stored on a Microsoft® Exchange® server computer.

9. The system of claim 1, wherein, in response to a request-for-service call from the voice device, the access module is configured to pass to the voice device less than all of the messaging/collaboration data exposed in response to the request-for-service call.

10. The system of claim 9, wherein the access module is configured to divide a message exposed in response to a request-for-service call from the voice device into sub-messages and transmit to the voice device a list of references to the sub-messages.

11. The system of claim 10, wherein the access module is configured to transmit ones of the sub-messages to the voice device in response to receipt of the corresponding references to the sub-messages from the voice device.

12. The system of claim 9, wherein the access module is configured to filter characters that are incompatible with the voice device from data items before passing the data items to the voice device.

13. The system of claim 1, wherein the access module is configured to reduce header and gateway data from data items before passing the data items to the voice device.

14. The system of claim 1, wherein the access module is configured to send a data item designated by the voice device to a fax server.

15. The system of claim 14, wherein the access module is configured to expand an attachment to the designated data item for fax transmission.

16. The system of claim 1, wherein the replacement reference is smaller in size than the messaging/collaboration server reference.

17. A system for providing remote electronic services to a wireless device, comprising:

an access module configured to expose messaging/collaboration data, including at least one of electronic mail data, calendar data, contacts data, and tasks data, that are stored on a messaging/collaboration server, wherein the access module is configured to manage amount of data transmitted to the wireless device to accommodate capacity constraints of the wireless device, wherein the access module additionally is configured to create a replacement reference identifying a data item identified by a messaging/collaboration server reference into the messaging/collaboration data, pass the replacement reference to the wireless device without passing the data item, and store an association between the replacement reference and the messaging/collaboration server reference, wherein the access module is configured to transmit the referenced data item to the wireless device in response to receipt of the replacement reference from the wireless device;

a wireless interface module configured to translate messaging/collaboration service requests from the wireless device for presentation to the access module and to translate a requested messaging/collaboration service deliverable from the access module for presentation to the wireless device, wherein the wireless interface module generates for presentation to the wireless device a request form containing a list of one or more messaging/collaboration service options; and a wireless interface access page configured to invoke a COM (Component Object Model) object in response to a request form completed by the wireless device.

18. The system of claim 17, wherein the COM object is configured to instantiate a server object for transmitting a request-for-service call to the access module.

19. The system of claim 17, further comprising a wireless gateway for translating communications from the wireless device from a first message transfer protocol into a second message transfer protocol.

20. The system of claim 19, wherein the wireless gateway is configured to translate between a wireless application protocol (WAP) and a hypertext transfer protocol (HTTP).

21. The system of claim 17, wherein the wireless interface module is configured to communicate with the access module in accordance with the hypertext transfer protocol (HTTP).

22. The system of claim 17, wherein the wireless interface module is configured to filter a requested messaging/collaboration service deliverable for presentation to the wireless device.

23. The system of claim 17, wherein the access module and the wireless interface module reside on different server computers.

24. The system of claim 17, wherein the access module is configured to expose messaging/collaboration data stored on a Microsoft® Exchange® server computer.

25. The system of claim 17, wherein, in response to a request-for-service call from the wireless device, the access module is configured to pass to the wireless device less than all of the messaging/collaboration data exposed in response to the request-for-service call.

26. The system of claim 25, wherein the access module is configured to divide a message exposed in response to a request-for-service call from the wireless device into sub-messages and transmit to the wireless device a list of references to the sub-messages.

27. The system of claim 26, wherein the access module is configured to transmit ones of the sub-messages to the wireless device in response to receipt of the corresponding references to the sub-messages from the wireless device.

28. The system of claim 25, wherein the access module is configured to filter characters that are incompatible with the wireless device from data items before passing the data items to the wireless device.

29. The system of claim 17, wherein the access module is configured to reduce header and gateway data from data items before passing the data items to the wireless device.

30. The system of claim 17, wherein the access module is configured to send a data item designated by the wireless device to a fax server.

31. The system of claim 30, wherein the access module is configured to expand an attachment to the designated data item for fax transmission.

32. The system of claim 17, wherein the replacement reference is smaller in size than the messaging/collaboration server reference.

* * * * *

UNITED STATES PATENT AND TRADEMARK OFFICE
CERTIFICATE OF CORRECTION

PATENT NO. : 7,260,536 B1  Page 1 of 1
APPLICATION NO. : 09/684065
DATED : August 21, 2007
INVENTOR(S) : Mamoun Abu-Samaha It is certified that error appears in the above-identified patent and that said Letters Patent is hereby corrected as shown below:

In column 1, line 13, after "Services To" insert -- One Or --.

In column 11, line 33, after "title" insert -- = --.

In column 11, line 34, above "<p>" insert -- </p> --.

In column 11, line 41, above "<p>" insert -- </p> --.

In column 12, lines 15-21, delete
"
    Inbox"0000000038A1BB1005ES101AA1BB08002B2A56C20000454D534D44422E4
    44C4C000000000000001BS5FA20AA6611CD9BC800AA002FC45A0C0000005843
    55503032002F6F3D68702F6F753D616D6572696361732F636E3D5265636970696E6E
    74732F636E3D616D2D363237353900"
                                                                              "
and insert
--  Inbox"0000000038A1BB1005E5101AA1BB08002B2A56C20000454D534D44422E444C4
    C000000000000001B55FA20AA6611CD9BC800AA002FC45A0C00000058435550303
    2002F6F3D68702F6F753D616D6572696361732F636E3D5265636970696E6E74732F636
    E3D616D2D363237353900"
                                                                     --, therefor.

Signed and Sealed this

Eighth Day of September, 2009

David J. Kappos
*Director of the United States Patent and Trademark Office*